(12) United States Patent
Coldwate et al.

(10) Patent No.: US 9,369,020 B2
(45) Date of Patent: Jun. 14, 2016

(54) PHASE SEPARATORS FOR ELECTRICAL MACHINES

(71) Applicant: Hamilton Sundstrand Corporation, Charlotte, NC (US)

(72) Inventors: Joseph K. Coldwate, Roscoe, IL (US); Wilfredo E. Colon Velazquez, South Beloit, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 205 days.

(21) Appl. No.: 14/184,036

(22) Filed: Feb. 19, 2014

(65) Prior Publication Data

US 2014/0175937 A1    Jun. 26, 2014

Related U.S. Application Data

(63) Continuation-in-part of application No. 13/724,809, filed on Dec. 21, 2012, now Pat. No. 9,124,158.

(60) Provisional application No. 61/886,405, filed on Oct. 3, 2013.

(51) Int. Cl.
*H02K 3/34* (2006.01)
*H02K 3/38* (2006.01)
*H02K 3/30* (2006.01)

(52) U.S. Cl.
CPC .. *H02K 3/34* (2013.01); *H02K 3/38* (2013.01); *H02K 3/30* (2013.01)

(58) Field of Classification Search
CPC ........................................................ H02K 3/30
USPC ...................................... 310/215, 179; 29/596
See application file for complete search history.

(56) References Cited

U.S. PATENT DOCUMENTS

| | | | |
|---|---|---|---|
| 2,471,840 A * | 5/1949 | Seely | G01K 5/323 310/68 C |
| 3,109,947 A | 11/1963 | Thompson et al. | |
| 3,439,205 A | 4/1969 | Houtman | |
| 3,909,648 A | 9/1975 | Clark | |
| 4,160,316 A | 7/1979 | Kindig | |
| 4,403,162 A | 9/1983 | Pallaro | |
| 4,455,743 A | 6/1984 | Witwer et al. | |
| 4,829,649 A | 5/1989 | Tribot | |
| 5,093,543 A | 3/1992 | Patton et al. | |
| 5,343,613 A * | 9/1994 | Kintz | H02K 11/0047 29/596 |
| 7,560,850 B2 | 7/2009 | Uetsuji et al. | |
| 7,649,296 B2 | 1/2010 | Fukasaku et al. | |
| 8,264,116 B2 | 9/2012 | Zahora et al. | |
| 2008/0246364 A1* | 10/2008 | Uetsuji | H02K 3/38 310/215 |
| 2010/0013349 A1 | 1/2010 | Breden et al. | |
| 2012/0235534 A1 | 9/2012 | Chamberlin | |

* cited by examiner

*Primary Examiner* — Hanh Nguyen
(74) *Attorney, Agent, or Firm* — Locke Lord LLP; Scott D. Wofsy; Christopher J. Cillié

(57) ABSTRACT

A phase separator for an electrical machine includes a first end portion, a second end portion, and a midsection. The midsection connects the first end portion to the second end portion such that the first end portion opposes the second end portion. The midsection is configured for fixing the phase separator in the electrical machine for separating the adjacent phase windings from one another. The first and second end portions are for separating end turns of adjacent phase windings of an electrical machine.

14 Claims, 3 Drawing Sheets

PHASE SEPARATORS FOR ELECTRICAL MACHINES

CROSS-REFERENCE TO RELATED APPLICATIONS

This application is a continuation-in-part of U.S. patent application Ser. No. 13/724,809, filed Dec. 21, 2012, and claims priority to and the benefits of U.S. Provisional Patent Application No. 61/886,405, filed on Oct. 3, 2013, each of which are incorporated by reference herein in their entireties.

BACKGROUND OF THE INVENTION

1. Field of the Invention

The present disclosure relates to power generation equipment, and more particularly to phase separators for electrical machines such as motors and generators with lap wound stators.

2. Description of Related Art

Electrical machines typically include a rotating portion referred to as a rotor and a stationary portion referred to as a stator. Either or both of the rotor and stator may include windings constructed from a conductive material. In an electric motor with a wound stator, the stator windings receive electrical energy that generates a rotating magnetic field that interacts with the rotor to generate mechanical energy. In an electric generator with a wound stator, mechanical energy provided to a rotor causes a magnetic field generated by the rotor to rotate and interact with the stator windings, inducing electric current in the windings. The stator typically includes a plurality of phase windings, e.g. three-phase, for receiving a three-phase alternating current in motor applications or for providing three-phase alternating current in electrical generating applications. In conventional wound stators, insulating material is placed between adjacent phase windings for purposes of electrically insulating adjacent windings from one another, thereby preventing shorts between the adjacent windings.

Such conventional methods and systems of insulating adjacent stator windings have generally been considered satisfactory for their intended purpose. However, there is still a need in the art for a stator winding insulation that allows for improved manufacturability of stator windings of electric machines. There also remains a need in the art for such an insulator that is easy to make and use. The present disclosure provides a solution for these problems.

SUMMARY OF THE INVENTION

A phase separator for an electrical machine includes a first end portion, a second end portion, and a midsection. The midsection connects the first end portion to the second end portion such that the first end portion opposes the second end portion. The midsection is configured and adapted for fixing the phase separator in the electrical machine for separating the adjacent phase windings from one another. The first and second end portions are for separating end turns of adjacent phase windings of an electrical machine.

In certain embodiments the midsection defines a longitudinally extending slot with opposed longitudinal edges corresponding to edges of a stator tooth of the electrical machine. The slot can have opposed arcuate edges joining the longitudinal edges and corresponding to edges of the stator tooth of the electrical machine. The slot is a first slot and that the midsection defines a second slot for fixing the phase separator in stator gaps defined by an adjacent stator tooth. The midsection can define a longitudinal axis evenly dividing the midsection and at least one of the end portions can be asymmetric with respect to the axis.

In accordance with certain embodiments, at least one of the end portions defines an outwardly facing arcuate edge segment corresponding to an end turn of the phase windings. At least one of the end portions can have a crescent shape. At least one of the end portions can have an inward edge extending laterally from the midsection for engaging an axial edge of an electrical machine stator. At least one of the end portions can define an outwardly facing arcuate edge segment corresponding to an end turn of the phase windings. At least one of the end portions can have an arcuate edge segment laterally offset from the midsection configured for receiving winding lacing cord. The midsection can also have an arcuate edge segment adjacent to arcuate edge segment for engaging an axial end of a stator of an electrical machine.

A lap wound stator for an electrical machine includes the phase separator described above, a first phase winding, and a second phase winding. The phase separator includes opposed first and second surfaces, and at least one of the end portions is asymmetric with respect to a longitudinal axis evenly dividing the phase separator midsection. The first phase winding is disposed over a portion of the first surface and the second phase winding disposed over a portion of the second surface such that the phase separator electrically insulates the first phase winding from the second phase winding.

In certain embodiments, the phase separator is a first separator and the stator includes a second phase separator and a three phase winding. The second phase separator includes third and fourth surfaces, a portion of the third surface is disposed over the second phase winding, and the third phase winding is disposed over the fourth surface of the phase separator such that second phase winding electrically insulates the second phase winding from the third phase winding.

It is contemplated that the at least one end portion of the phase separator includes inwardly and outwardly facing arcuate edge segments, defining a pliable segment the arcuate edge segments. The outwardly facing edge can remain fixed between end turns of adjacent end turns while a portion of the pliable segment adjacent the inwardly facing arcuate edge is manipulated to install lacing cord through end turns of the phase windings.

An electrical machine includes a stator core and a phase separator as described above. The stator core includes first and second axially extending teeth circumferentially adjacent to each other. The midsection of the phase separator defines a leg, and the leg is seats between a gap defined between the first and second teeth.

In certain embodiments, the first and second stator teeth fix the leg of phase separator circumferentially. The midsection can define a second leg. The second leg can seat on a side of one of the first and second stator teeth opposite the gap in which the first leg seats. It is contemplated that at least one of the end portions can remain fixed by the phase windings when the end portion is manipulated during installation of phase winding end turn lacing These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
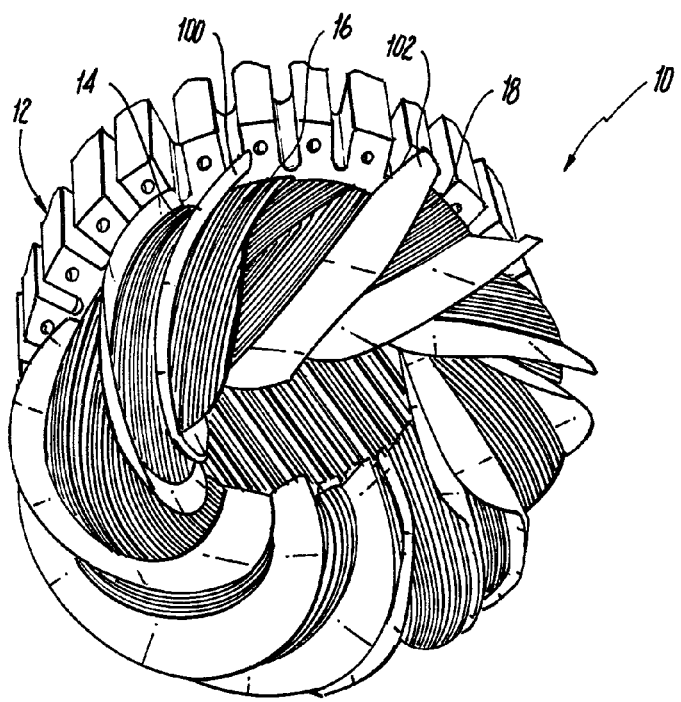
FIG. 1 is a perspective end view of an exemplary embodiment of a stator core for an electrical machine constructed in accordance with the present disclosure, showing phase separators seated in the stator between adjacent phase windings.

Reference will now be made to the drawings wherein like reference numerals identify similar structural features or aspects of the subject disclosure. For purposes of explanation and illustration, and not limitation, a partial view of an exemplary embodiment of an electric machine including the phase separator in accordance with the disclosure is shown in FIG. 1 and is designated generally by reference character 100. Other embodiments of the phase separator in accordance with the disclosure, or aspects thereof, are provided in FIGS. 2-4, as will be described. The systems and methods described herein can be used electrical machines, such as motors and generators for aircraft for example.

FIG. 1 shows a stator 10 for an electrical machine. Stator 10 is a lap wound stator and includes a winding body 12, a plurality of phase windings (e.g. a first phase winding 14, a second phase winding 16, and a third phase winding 18), and a plurality of phase separators (e.g. first phase separator 102 and second third phase separator 104). Winding body 12 is longitudinally extending cylindrical body constructed from a ferromagnetic material, such as steel. Winding body 12 can be either a stator core or a rotor core, and will be described below as a stator for purposes of illustration and not limitation.

Phase windings 14, 16, and 18 longitudinally extending wire bundles which longitudinally traverse winding body 12, defining respective end turn portions (shown in FIG. 2A) the bundle changes direction at respective ends of stator core 12. Phase separators 102 and 104 are physical and electrical separators that extend longitudinally within stator core 12 between adjacent phase windings. Phase separators 102 also define respective end portions (shown in FIG. 3) that longitudinally extend beyond respective ends of stator core 12. As will be appreciated by those skilled in the art, embodiments of the phase separators described herein can be used with polyphase electrical machines, i.e. two phase and three phase motors and generators. Although described in terms of electrical machine stators, embodiments of the phase separators described herein are also suitable for electrical machine rotors.

Figure 2A:
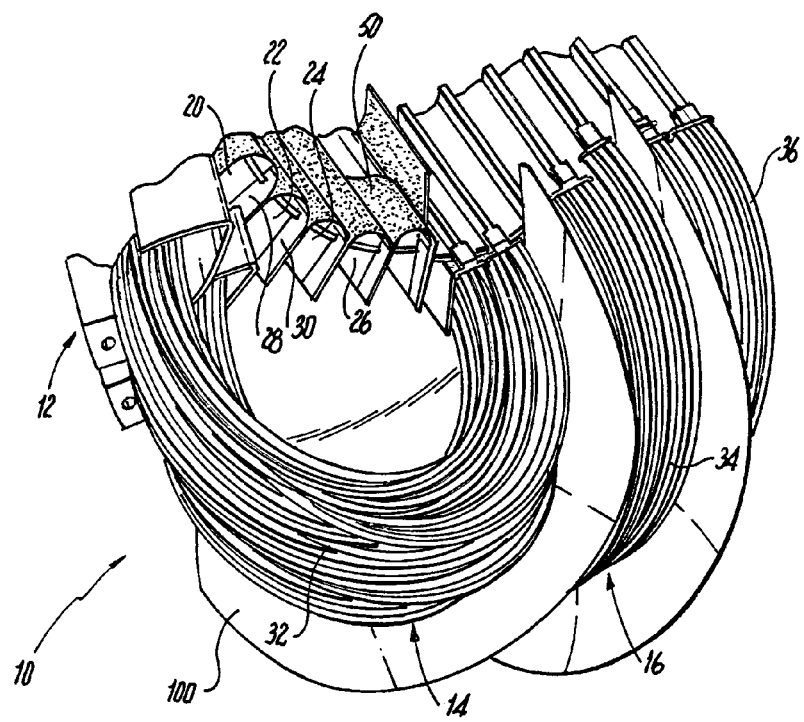
FIG. 2A is a perspective end view of the stator core of FIG. 1 in a partially assembled configuration, showing adjacent phase winding end turns separated by phase separators.

With reference to FIG. 2A, a stator 10 is shown in a partially assembled configuration. Stator core 12 includes a plurality of axially extending stator teeth (e.g. a first tooth 20, a second tooth 22, and a third tooth 24) defined about an inner periphery of stator core 12. First, second, and third stator tooth 20, 22, and 24 are oriented radially inward, and respectively define longitudinally extending gaps between adjacent teeth. First tooth 20 is circumferentially adjacent to second tooth 22. Second tooth 22 is circumferentially adjacent to third tooth 24. First tooth 20 and second tooth 22 define a first gap 28 between the teeth configured and adapted for receiving phase windings. Second tooth 22 and third tooth 24 define a second gap 30 between the teeth also configured and adapted for receiving windings. Stator 10 includes axially opposed first and second ends, a first end of stator 10 being shown only in FIGS. 1, 2A, 2B and 4 for purposes of clarity. Axial end portions 26 of the stator teeth define an axial face of stator core 12.

Stator core 12 forms part of a lap wound stator 10 of a poly-phase electric motor. Stator 10 includes pre-cut phase separators 100 constructed from insulation paper or film pieces that are installed in-between each winding group, including respective end turn portions of the windings (e.g. a first end turn portion 32 and a second end turn 34). As will be appreciated by those skilled in the art, each phase of a poly-phase electrical machine must be electrically insulated from the other phases for efficient operation of the electrical machine. First and second phase separators 100 and 102 electrically insulate and physically isolate the conductive wires forming first and second phase windings 14 and 16, thereby preventing first phase winding 14 from contacting and electrically shorting with second phase winding 16.

Figure 2B:
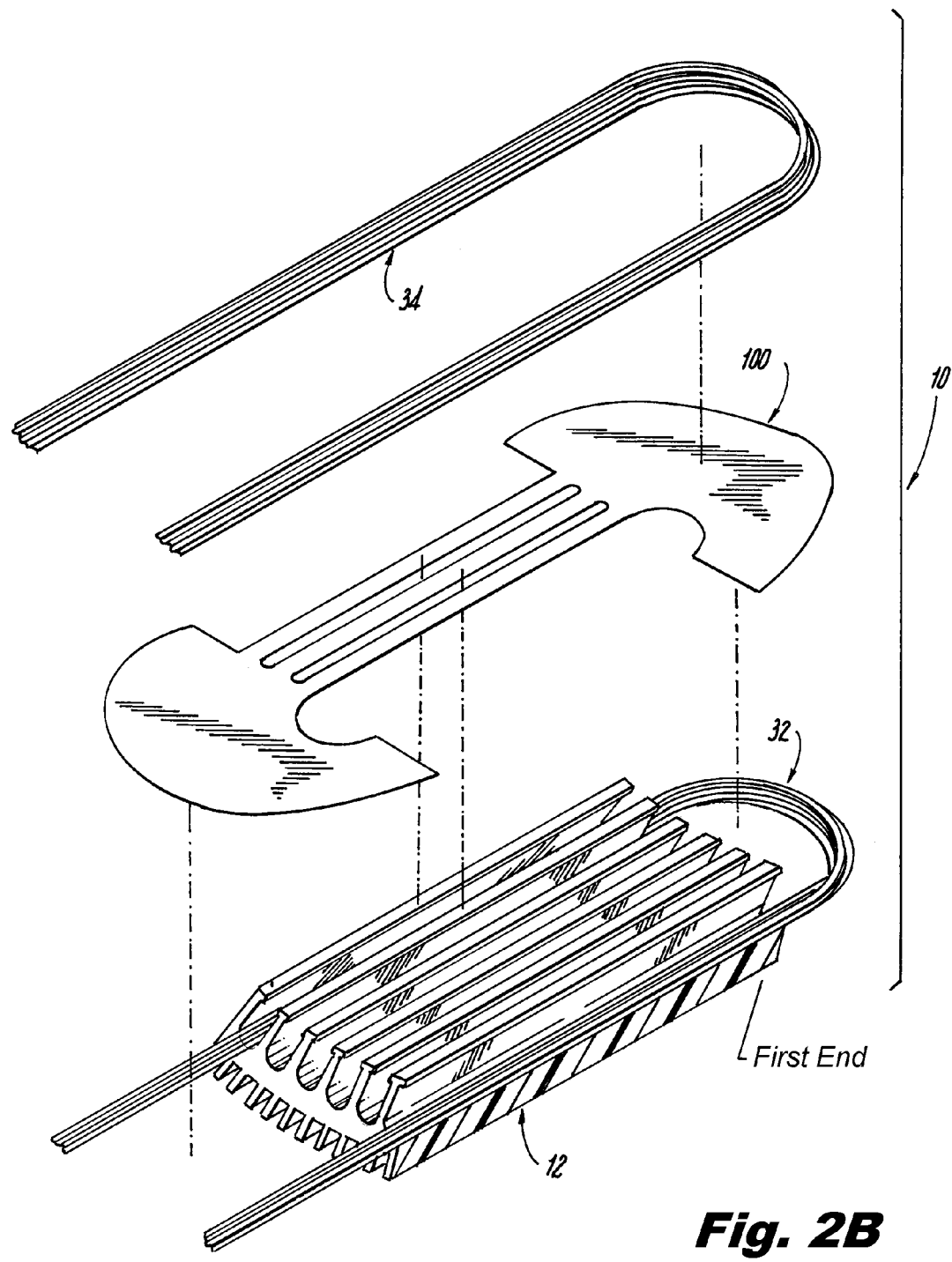
FIG. 2B is an exploded view of the stator core of FIG. 1, showing a portion of the stator core, phase windings, and a phase separator.

With reference to FIG. 2B, stator core 12 is shown in an exploded configuration. As illustrated, stator core 12 has a planar shape. This is for illustrative purposes only for purpose of showing the assembly of stator core 12. As will be appreciated, stator core 12 has an arcuate shape. First and second phase separators 100 and 102 are installed during manufacture of stator core 12. First phase winding 32 seats within longitudinally extending gaps between adjacent stator teeth of the stator core. First phase separator 100 then seats in stator core 12 over first phase winding 32 such that it physically contacts first phase winding 32. Second phase winding 34 seats thereafter seats over first phase separator such that it is electrically isolated from first phase winding 32. As will be appreciated, successive phase windings and phase separators are installed staggered between teeth as suited for the electrical machine, thereby forming the arrangement shown in FIG. 1 (FIG. 2A showing stator 10 during the assembly process).

Figure 4:
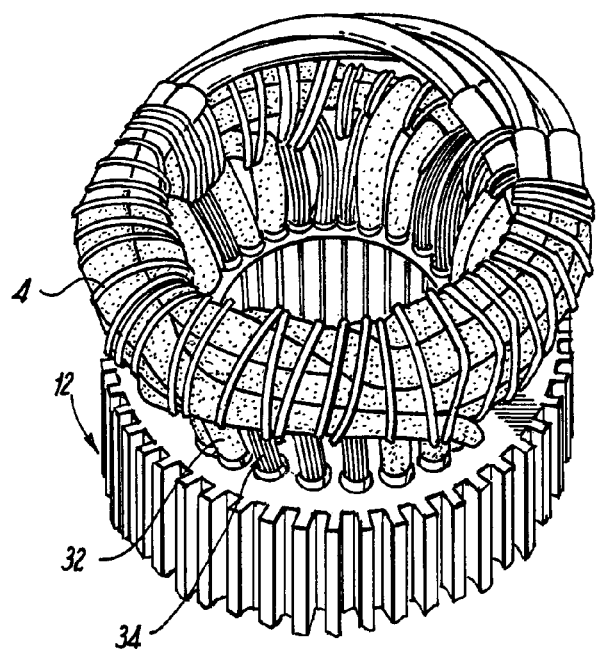
FIG. 4 is a perspective end view of an electrical machine including the stator of FIG. 1, showing lacing cord securing end turns on an end of the stator core.

Subsequent to installation of first and second phase separators 100 and 102 first and second end turn portions 32 and 34 are bound with lacing cord 4 (shown in FIG. 4). Lacing cord 4 provides structural support to the winding end turns, keeping them in position during assembly and operation of the electrical machine incorporating stator core 12. Lacing cord 4 can also prevent first and second phase windings 32 and 34 from interfering with other components of the electrical machine, and can properly place phase windings 32 and 34 in contact with thermally sensitive elements used for machine overheating protection.

During lacing cord installation, phase separator insulation can lift up and move out of position due to manipulation of the end turns during the operation. When the insulation paper moves out of position, it leaves the electrical machine vulnerable in location where the insulation paper has moved out of position because the windings from different phases are in closer proximity to one another.

As opposed to phase down wound stators where an entire phase is inserted into the stator core before the next phase is inserted, lap wound stators include phase windings inserted in a lapping pattern. Lap wound stators include portions from more than one phase winding successively positioned within a common stator gap. Since the phase windings are in close proximity to one another, lap wound stators are susceptible to phase-to-phase shorts, e.g. adjacent phases contacting one another. The phase windings therefore require isolation, e.g. adequate dielectric protection, between the adjacent phase windings both in the stator gaps and the phase winding end turns at respective ends of stator core 12.

Figure 3:
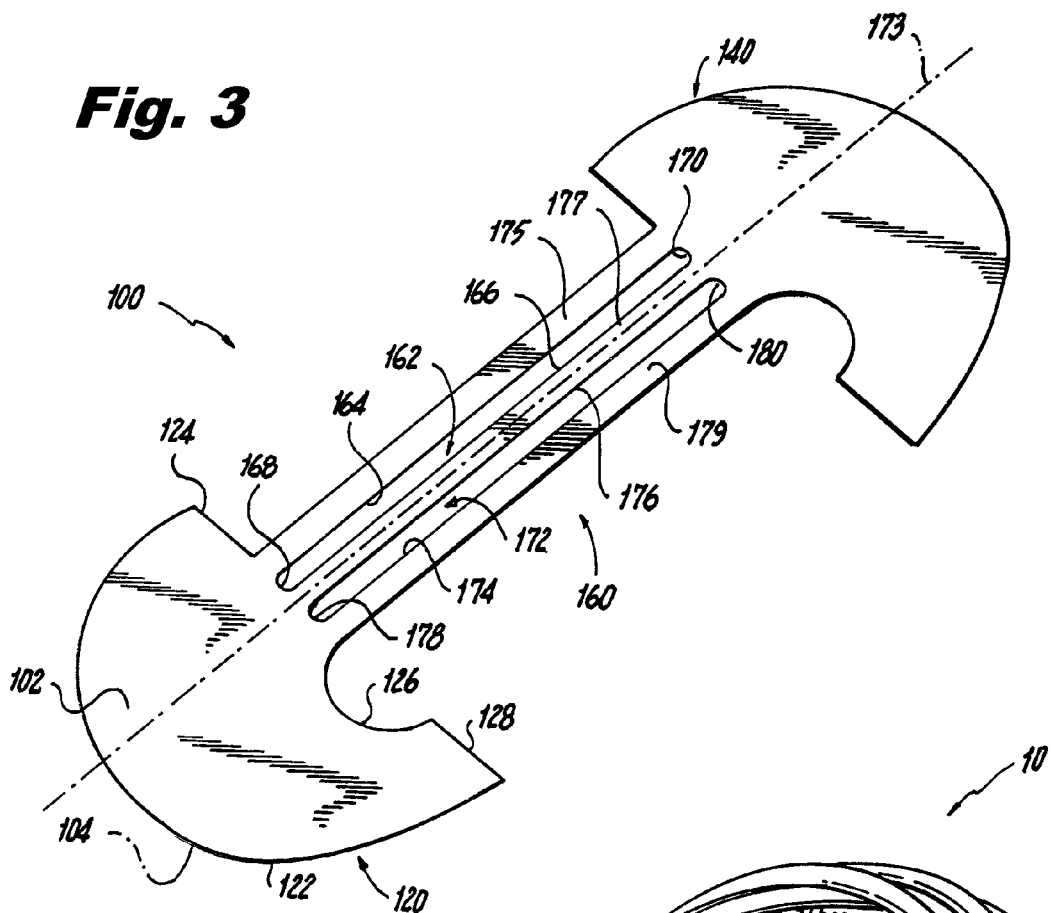
FIG. 3 is a perspective view of the phase separator of FIG. 1, showing the first and second end portions and the midsection connecting the first and second end portions.

With reference to FIG. 3, first phase separator 100 is shown. First phase separator 100 is pre-cut in a specific shape that lends itself to lap winding that simplifies installation and prevents out of position movement of the phase winding during the lacing operation that typically follows winding. First phase separator 100 includes a first end portion 120, a second end portion 140, and a midsection 160. Midsection 160 connects first end portion 120 to second end portion 140 such that first end portion 120 is arranged on an axially opposite end from second end portion 140. First phase separator 100 is constructed from an electrically insulating material, such as dielectric paper or film. As will be appreciated by those skilled in the art, first phase separator 100 can be constructed from other electrically insulating materials as suitable for a given application. As will be appreciated, stator core 12 can include any number of phase separators as suitable for a given electrical machine design.

Midsection 160 is configured for fixing first phase separator 100 in an electrical machine including stator 10 for separating adjacent phase windings 14 and 16 from one another. First and second end portions 120 and 140 include a separator body having opposing surfaces 102 and 104 for separating end turns of adjacent phase windings of an electrical machine. Midsection 160 defines a first longitudinally extending slot 162 with opposed longitudinal edges 164 and 166. Longitudinal edges 164 and 166 correspond to the stator teeth of stator core 12, and have substantially the same axial length as stator tooth 20, 22, and 24 of stator core 12. Slot 162 has opposed first and second arcuate edges 168 and 170 that correspond to the axial edges of the stator teeth of stator core 12. Arcuate edges 168 and 170 are formed with an arcuate planar shape such that when bowed to conform with the circumference of stator core 12 first and second arcuate edges 168 and 170 conform to planar surfaces of axial end portions 26.

In the illustrated embodiment of first phase separator 100, slot 162 is a first slot and midsection 160 defines a second slot 172. Second slot 172 is similar in construction to first slot 162, and includes first and second longitudinal edges 174 and 176 and first and second arcuate edges 178 and 180. Edges 174, 176, 178, and 180 also correspond to longitudinal and axial surfaces of the stator tooth of the electrical machine. The slot is a first slot and that the midsection defines a second slot for fixing the phase separator in stator gaps defined by an adjacent stator tooth.

Midsection 160 includes a plurality of legs connecting first and second end portions 120 and 140 to one another. In the illustrated embodiment, first phase separator 100 includes a first leg 175, a second leg 177 and a third leg 179. Second leg 177 is disposed between first and third legs 175 and 179, second leg 177 being adjacent and on one side of first leg 175 and second leg 177 being adjacent and on one side of third leg 179. First, second, and third legs 175, 177, and 179 have widths suitable to seat the respective leg between circumferentially adjacent stator teeth within the gaps (slots) of which the legs are installed in-between two different phase windings within the gaps (slots) of stator core 12, thereby fixing the phase separator in stator core 12. Since arcuate edges, e.g. first and second arcuate edges 168 and 170, span a single tooth of stator core 12, second and third leg 177 and 179 seat in slots circumferentially adjacent to the slot in which first leg 175 seats. This provides for secure seating of first phase separator 100 in stator core 12 between a pair of phase windings occupying a common slot. As will be appreciated, phase separator 100 can include one leg, two legs, or four or more legs as is suitable for a given application.

Midsection 160 defines a longitudinal axis 173 that evenly divides midsection 160 into two even sections. First and second end portions 120 and 140 are asymmetric with respect to axis 173. As shown in FIGS. 1 and 2, respective end turns 32, 34, and 36 of phase windings 14, 16, and 18 loop back into stator core 12 in stator gaps separated by at least two intervening stator teeth. Asymmetrically forming end portions 120 and 140 provides a phase separator that accommodates such phase winding spacing. As will be appreciated by those skilled in the art, the asymmetric shape of phase separator is a function of the end turn radius of the winding end turns, which is an artifact of the design of the specific electrical machine. As such, the asymmetrical shape of the end portions of first phase separator 100 is as suitable for a given application of first phase separator 100. In embodiments, at least one of the first and second end portions 120 and 140 has a crescent shape, thereby spanning multiple stator teeth and bowing about a portion of the circumference of stator core 12.

First end portion 120 includes an outwardly facing arcuate edge segment 122, a first inward facing edge 124, an inward facing arcuate edge 126, and a second inward facing edge 128. First inward facing edge 124 is adjacent to and extends laterally from first leg 175, and is configured for engaging an axial surface of an end portion of a tooth of stator core 12. Inward facing arcuate edge 126 is adjacent to and extends laterally from third leg 179, and is configured with a contour to complement the coil shape and to receive lacing cord for securing phase winding end turns. Second inward facing edge 128 extends from an end of inward facing arcuate edge 126 opposite third leg 179, and is configured for engaging an axial surface on an end portion of a tooth of stator core 12. Second end portion 140 is similar in construction to first end portion 120, and in embodiments axial fixes first phase separator 100 in stator core 12 between opposing inward facing edges of first and second end portions and contacting respective end surfaces of stator core 12. Inward facing arcuate edge 126 can prevent the phase separator from bunching up during the lacing operation, and in embodiments can include notches or slits to seat about the cord during the operation.

First, second and third support legs 175, 177 and 179 provide an additional layer of electrical insulation within the respective gaps (slots) into which they seat, thereby contributing additional dielectric and physical separation to adjacent phases within a given gap (slot). First, second and third support legs 175, 177 and 179 of phase separator 100 also provide mechanical stabilization of coil separators 50 within the gaps (slots), thereby preventing them from moving or twisting out position, such as during installation of lacing cord within respective end turns of stator core 12.

The methods and systems of the present disclosure, as described above and shown in the drawings, provide for phase separators with superior properties including improving manufacturability of electrical machines including such phase separators. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A phase separator for an electrical machine, comprising:
a first end portion configured and adapted for separating first end turns of adjacent phase windings;
an opposed second end portion configured and adapted for separating second end turns of the adjacent phase windings; and
a midsection connecting the first and second end portions, wherein the midsection is configured to fix the phase separator in an electrical machine and provide physical and dielectric separation between adjacent phase windings sharing a common slot,
wherein at least one of the end portions has an arcuate edge segment that is laterally offset from the midsection and is configured for receiving winding lacing cord.

2. A phase separator as recited in claim 1, wherein the midsection defines a longitudinally extending slot with opposed longitudinal edges, wherein the longitudinal edges correspond to edges of a stator tooth of the electrical machine.

3. A phase separator as recited in claim 2, wherein the longitudinal slot defines opposed arcuate edges joining the longitudinal edges, wherein arcuate edges correspond to edges of the stator tooth of the electrical machine.

4. A phase separator as recited in claim 2, wherein the longitudinal slot is a first slot and the midsection further includes a second slot for fixing the phase separator in stator gaps defined by a second stator tooth.

5. A phase separator as recited in claim 1, wherein one of the first end portion and the second end portion defines an outwardly facing arcuate edge segment corresponding to an end turn of the phase windings.

6. A phase separator as recited in claim 5, wherein at least one of the end portions has a crescent shape.

7. A phase separator as recited in claim 1, wherein at least one of the end portions has an inward edge extending laterally from the midsection for engaging an axial edge of an electrical machine stator.

8. A phase separator as recited in claim 1, wherein both the first and second end portions of the phase separator define an outwardly facing arcuate edge segment corresponding to an end turn of the phase windings.

9. A phase separator as recited in claim 1, wherein at least one of the end portions is asymmetric with respect to a longitudinal axis defined by the midsection.

10. A phase separator as recited in claim 1, wherein the arcuate edge segment is adjacent an inwardly facing edge segment for engaging an axial end of a stator of an electrical machine.

11. A stator for an electrical machine, comprising:
a phase separator as recited in claim 1 having opposed first and second surfaces;
a first phase winding disposed over a portion of the first surface; and
a second phase winding disposed over a portion of the second surface, wherein at least one of the end portions is asymmetric with respect to a longitudinal axis evenly dividing the midsection, and wherein the phase separator electrically insulates the first phase winding from the second phase winding.

12. A stator as recited in claim 11, wherein the phase separator is a first phase separator, and further including:
a second phase separator having opposed third and fourth surfaces, wherein a portion of the third surface is disposed over the second phase winding; and
a third phase winding disposed over a portion of the fourth surface of the phase separator, wherein the second phase separator electrically insulates the second phase winding from the third phase winding.

13. A stator as recited in claim 11, wherein the first end portion of the phase separator includes:
an outwardly facing arcuate edge segment;
an inwardly facing arcuate edge segment; and
a pliable segment extending between the inwardly and outwardly facing arcuate edge segments, wherein the pliable segment is fixed between phase winding end turns proximate the outwardly facing arcuate edge segment while a portion of the pliable segment adjacent the inwardly facing arcuate segment is manipulated while installing lacing cord through end turns of the phase windings.

14. A stator as recited in claim 11, wherein at least one of the end portions defines an outwardly facing arcuate edge segment corresponding to an end turn of the phase windings.

* * * * *